(12) United States Patent
Kameswaran et al.

(10) Patent No.: US 11,871,238 B2
(45) Date of Patent: Jan. 9, 2024

(54) AIDING MULTICAST NETWORK PERFORMANCE BY IMPROVING BOOTSTRAP MESSAGING

(71) Applicant: DELL PRODUCTS L.P., Round Rock, TX (US)

(72) Inventors: Sriraghav Kameswaran, Chennai (IN); Vidya Chidambaram, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 379 days.

(21) Appl. No.: 16/820,391

(22) Filed: Mar. 16, 2020

(65) Prior Publication Data
US 2021/0289350 A1   Sep. 16, 2021

(51) Int. Cl.
| H04W 12/50 | (2021.01) |
| H04W 28/06 | (2009.01) |
| G06Q 30/02 | (2023.01) |
| H04L 12/18 | (2006.01) |
| G06Q 30/0241 | (2023.01) |

(52) U.S. Cl.
CPC ........ H04W 12/50 (2021.01); G06Q 30/0241 (2013.01); H04L 12/1845 (2013.01); H04W 28/06 (2013.01)

(58) Field of Classification Search
None
See application file for complete search history.

(56) References Cited

U.S. PATENT DOCUMENTS

| 6,636,895 B1* | 10/2003 | Li | H04L 45/02 370/351 |
| 6,791,980 B1* | 9/2004 | Li | H04L 45/00 370/390 |
| 9,019,981 B1* | 4/2015 | Weinstein | H04L 45/16 370/432 |

(Continued)

OTHER PUBLICATIONS

N. Bhaskar, A. Gall, J. Lingard, S. Venaas, "Bootstrap Router (BSR) Mechanism for PIM", Jul. 2007, Internet Engineering Task Force (IETF), draft-ietf-pim-sm-bsr-11.txt., pp. 1-45. (Year: 2007).*

(Continued)

*Primary Examiner* — Chirag G Shah
*Assistant Examiner* — Suk Jin Kang
(74) *Attorney, Agent, or Firm* — NORTH WEBER & BAUGH LLP

(57) ABSTRACT

Described herein are systems and methods to improve multicast network performance by improving bootstrap message (BSM) in a bootstrap router (BSR). After BSR election, all candidate Rendezvous Points (C-RPs) send their group-to-RP mapping information to the elected BSR (E-BSR). The E-BSR collects the group-to-RP information from C-RPs and forms bootstrap message (BSM) comprising information of a RP set. A global flag and one or more group flags are incorporated into the BSM to indicate whether the BSM has changed since last transmission and which part of the BSM has changed. The length of the BSM to be transmitted may be dynamically determined. Upon receiving the BSM, each multicast router may operate according to the flags embedded in the BSM. Therefore, the processing process for the BSM at multicast router side may be simplified.

20 Claims, 8 Drawing Sheets

(56) References Cited

U.S. PATENT DOCUMENTS

| | | | | |
|---|---|---|---|---|
| 2003/0193958 | A1* | 10/2003 | Narayanan | H04L 45/22 370/400 |
| 2005/0190765 | A1* | 9/2005 | Gotoh | H04L 12/1886 370/390 |
| 2008/0089332 | A1* | 4/2008 | Giovanni | H04L 41/0803 370/390 |
| 2008/0101361 | A1* | 5/2008 | Brown | H04L 12/1877 370/432 |
| 2010/0241738 | A1* | 9/2010 | Noguchi | H04L 67/125 707/802 |
| 2014/0036915 | A1* | 2/2014 | Dholakia | H04L 49/354 370/390 |
| 2014/0082161 | A1* | 3/2014 | Yu | H04L 45/04 709/220 |
| 2014/0112202 | A1* | 4/2014 | Senevirathne | H04L 12/462 370/256 |
| 2014/0146659 | A1* | 5/2014 | Qin | H04L 45/28 370/218 |
| 2016/0080446 | A1* | 3/2016 | Karthikeyan | H04L 61/2061 709/219 |
| 2016/0103666 | A1* | 4/2016 | Choi | G06F 8/4441 717/153 |
| 2018/0013574 | A1* | 1/2018 | Xie | H04L 12/5601 |
| 2021/0014159 | A1* | 1/2021 | Mishra | H04L 45/16 |

OTHER PUBLICATIONS

D. Estrin, M. Handley, A. Helmy, P. Huang, D. Thaler, "A Dynamic Bootstrap Mechanism for Rendezvous-based Multicast Routing", Mar. 1999, IEEE Xplore—IEEE INFOCOM 1999, entire document. (Year: 1999).*

Bhaskar et al., "Bootstrap Router (BSR) Mechanism for PIM," Jul. 9, 2007, [online], [Retrieved Oct. 14, 2020]. Retrieved from Internet <URL: https://tools.ietf.org/html/draft-ietf-pim-sm-bsr-11#page-28> (45 pgs).

Fenner et al.,"Protocol Independent Multicast—Sparse Mode (PIM-SM): Protocol Specification," Aug. 2006, [online], [Retrieved Oct. 14, 2020]. Retrieved from Internet <URL: https://tools.ietf.org/html/rfc4601> (112 pgs).

"Multicast PIM Boostrap (BSR)," [online], [Retrieved Oct. 14, 2020]. Retrieved from Internet <URL: https://networklessons.com/cisco/ccie-routing-switching/multicast-pim-bootstrap-bsr> (7pgs).

Bhaskar et al.,"Bootstrap Router (BSR) Mechanism for Protocol Independent Multicast (PIM)," Jan. 2008, [online], [Retrieved Oct. 14, 2020]. Retrieved from Internet <URL: https://tools.ietf.org/html/rfc5059#section-4.1> (41pgs).

"Rendezvous Point Engineering," Cisco Systems, 2009, [online], [Retrieved Oct. 14, 2020]. Retrieved from Internet <URL: https://www.cisco.com/c/en/us/products/collateral/ios-nx-os-software/ip-multicast/whitepaper_c11-508498.html> (6pgs).

* cited by examiner

600

In response to a C-RP removed from a RP set, an E-BSR generates a BSM comprising a BSM header with a false NC flag and one or more group sections with a false GNC flag for each group section ⟋ 605

AIDING MULTICAST NETWORK PERFORMANCE BY IMPROVING BOOTSTRAP MESSAGING

BACKGROUND

The present disclosure relates generally to information handling system. More particularly, the present disclosure relates to improving multicast network performance by improving bootstrap messaging (BSM) in a bootstrap router (BSR).

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a multicast network, after BSR election, all candidate Rendezvous Points (C-RPs) send their group-to-RP mapping information to the elected BSR (E-BSR). The E-BSR collects the group-to-RP information from C-RPs and forms a RP set information, which is broadcasted to all connected multicast routers. Each multicast router, upon receiving the RP set information, forwards the information to multicast-enabled routers in their Protocol Independent Multicast (PIM) domain.

For a multicast network comprising many RPs, the RP set message may be huge. Even if there is no change in RP set information, there may be high utilization of resources in both transmitting, receiving and processing the BSM in the entire PIM domain. The BSM messages might need to be fragmented to fit into a maximum transmission unit (MTU) interface of the routers, which in turn requires reassembling at peer end, and therefore, performance of the multicast network is negatively impacted.

Accordingly, it is highly desirable to find new, more efficient ways to improve the BSM from the BSR for improved multicast network performance.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

FIG. 6 depicts a process of generating BSM when a candidate RP is removed, according to embodiments of the present disclosure.

DETAILED DESCRIPTION OF THE PREFERRED EMBODIMENTS

Figure 1:
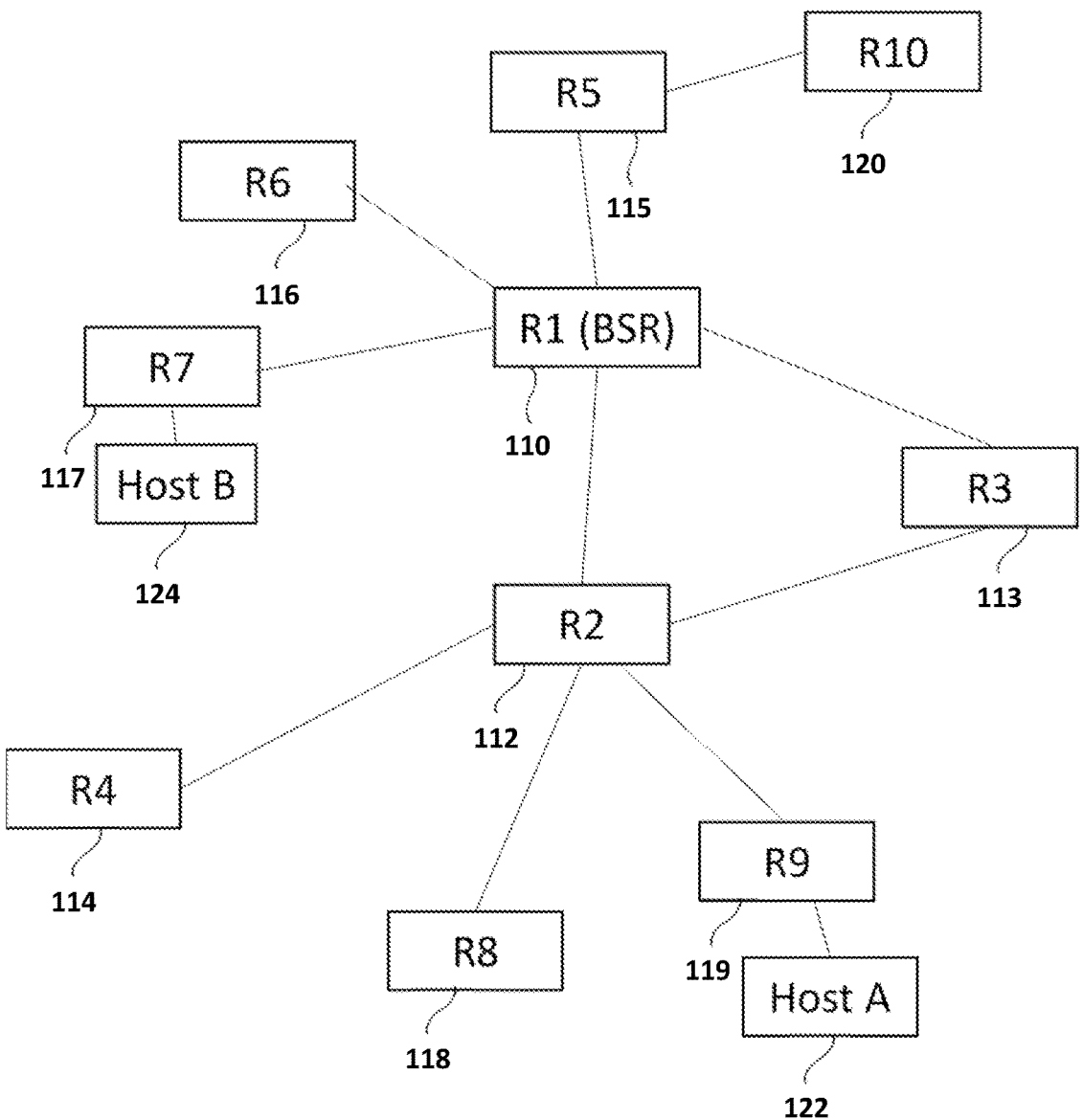
FIG. 1 depicts a topology of an elected BSR and a plurality of RPs, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any mathematic expressions and results provided herein are provided by way of illustration and were performed under specific conditions using a specific embodiment or embodiments; accordingly, neither these mathematic expressions nor their results shall be used to limit the scope of the disclosure of the current patent document.

It shall also be noted that although one or more embodiments described herein may be within the context of BSR Mechanism, aspects of the present disclosure are not so limited. Accordingly, the aspects of the present disclosure may be applied or adapted for use in other mechanisms in multicast contexts.

A. Embodiments of Improved Bootstrap Messaging

FIG. 1 depicts a topology of a multicast network 100 comprising a BSR 110, a plurality of routers (e.g. 112~119), and one or more host (e.g. host 120 and host 122) coupled to corresponding routers, according to one or more embodiments of the present disclosure. After one of the routers (e.g. router R1 110) is elected as the BSR, all candidate Rendezvous Points (C-RPs) (e.g. router R2 112 and router R5 115) send their C-RP messages (or advertisement messages) to the elected BSR (E-BSR). An RP is a router in a multicast network domain acting as a shared root for a multicast shared tree. A C-RP is a router that is advertising itself who wants to become an RP. Any number of routers may be configured to work as RPs and they may be configured to cover different group ranges. Each multicast router within a PIM domain may be able to map a particular multicast group address to the same RP. In one or more embodiments, an advertisement message from a C-RP comprises the priority of the advertising C-RP, as well as group-to-RP mapping information of the C-RP, e.g., a list of group ranges for which the C-RP is advertised. In one or more embodiments, the advertisement message is periodically sent from a C-RP to the E-BSR in an advertisement interval to inform the BSR of the C-RP's willingness to function as an RP.

The E-BSR 110 collects the advertisement messages from all C-RPs to form or update a bootstrap message (BSM), which is broadcasted to all connected multicast routers. Each multicast router, upon receiving the BSM, forwards the information to multicast-enabled routers in their Protocol Independent Multicast (PIM) domain. In one or more embodiments, the BSM comprises information of a RP set. In one or more embodiments, C-RPs in the RP set may be selected by the BSR among all the C-RPs sending advertisement messages. The RP set may be formed or updated by the E-BSR based on the advertisement messages from all the C-RPs.

Figure 2:
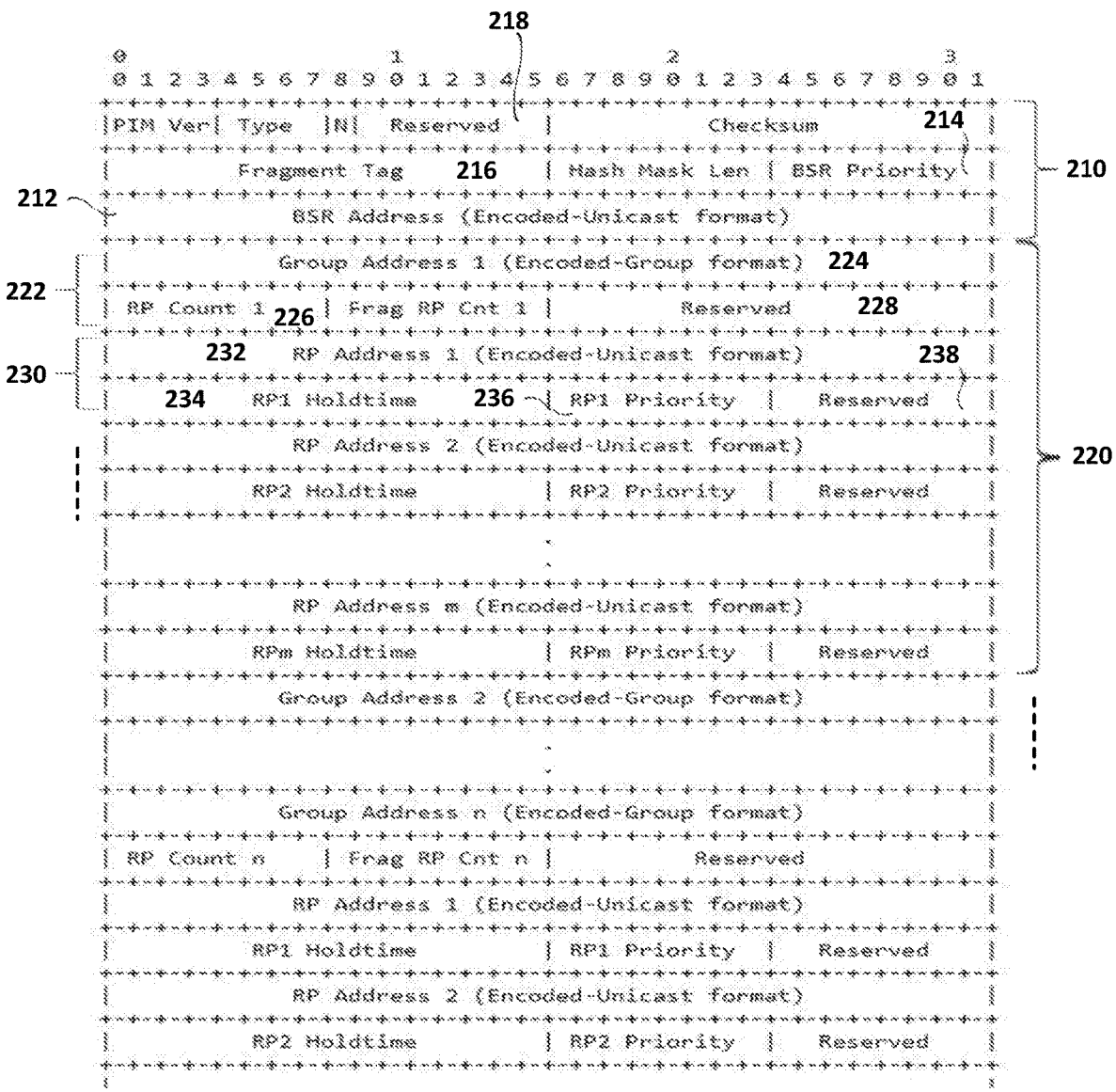
FIG. 2 depicts a bootstrap message, according to embodiments of the present disclosure.

FIG. 2 depicts a BSM, according to one or more embodiments of the present disclosure. As shown in the FIG. 2, the BSM 200 comprises a BSM header 210 and a RP set comprising one or more group sections 220. The BSM header 210 may comprise information of BSR address 212, BSR priority 214, PIM message type (Type, as shown in FIG. 2), Hash Mask length (Hash Mask Len, as shown in FIG. 2), fragment tag 216, PIM version, one or more reserved bits 218, etc. BSR address indicates the address of the BSR for the domain. In one or more embodiments, the format for BSR address may be given in an Encoded-Unicast address. BSR priority contains BSR priority value of the BSR. In one or more embodiments, the fragment tag 216 may be a randomly generated number to distinguish the fragments belonging to different Bootstrap messages. Fragments belonging to same Bootstrap message have the same fragment tag. The one or more reserved bits 218 are traditionally set to zero on transmission and/or are ignored upon receipt.

In one or more embodiments, each group section 220 may comprise a group header 222 and one or more C-RP sections 230. The group header 222 may comprise information of group address 224, RP count 226 indicating number of C-RPs for the group, fragment RP count indicating number of C-RPs for the group in this fragment of the BSM (corresponding to situations in which a BSM is segmented or split into multiple segments), one or more reserved bits 228 for the corresponding group, etc. The group address 224 indicates the address or an address range of the C-RPs in the group. In one or more embodiments, the format for group address 224 may be given in the Encoded-Unicast address. In one or more embodiments, each C-RP section 230 may comprise information of an RP address 232 indicating the address of the C-RP, an RP holdtime 234 indicating holdtime (e.g. in seconds) for the corresponding C-RP, an RP priority 236 indicating priority of the corresponding C-RP, and one or more reserved bits 238 for the corresponding RP. In one or more embodiments, the format for RP address may be given in the Encoded-Unicast address.

In one or more embodiments, a bootstrap message may be divided up into multiple bootstrap message fragments (BSMFs) if datagram of the BSM exceeds the maximum packet size boundaries. All BSMFs of a given BSM may need to have identical values for the type, fragment tag, Hash Mask Len, BSR Priority and BSR address. The BSMFs may be differentiated by different group-to-RP mappings or different group sections 220.

For a multicast network comprising many RPs, the RP set message may be huge. Even if there is no change in RP set information, there may be high utilization of resources in both transmitting, receiving and processing the packets in the entire PIM domain. The BSM messages need to be fragmented to fit into a maximum transmission unit (MTU) interface of the routers, which in turn requires reassembling at peer end, and therefore, performance of the multicast network is negatively impacted.

In this section, one or more embodiments of incorporating one or more flags into the BSM are disclosed in improving the BSM to improve multicast network performance. The one or more flags may be used to indicate whether the BSM has changed since last transmission and/or which part of the BSM has changed. The length of the BSM to be transmitted may be dynamically determined accordingly. Additionally, each multicast router, upon receiving the BSM, may operate according to the one or more flags embedded in the BSM.

1. Embodiments of Incorporating an NC Flag in a BSM Header

In one or more embodiments, the one or more flags incorporated into the BSM comprise a first flag using one or more reserved bits 218 in the BSM header 210. The first flag, also-known-as a no change (NC) flag or a global flag, indicates whether there is any difference in the present BSM (or current RP set information) from a last BSM (or a previous RP set information). In one or more embodiments, the NC flag is one bit with logic "1" or true indicting no changes for the RP set and logic "0" or false indicting change occurred for the RP set.

Figure 3:
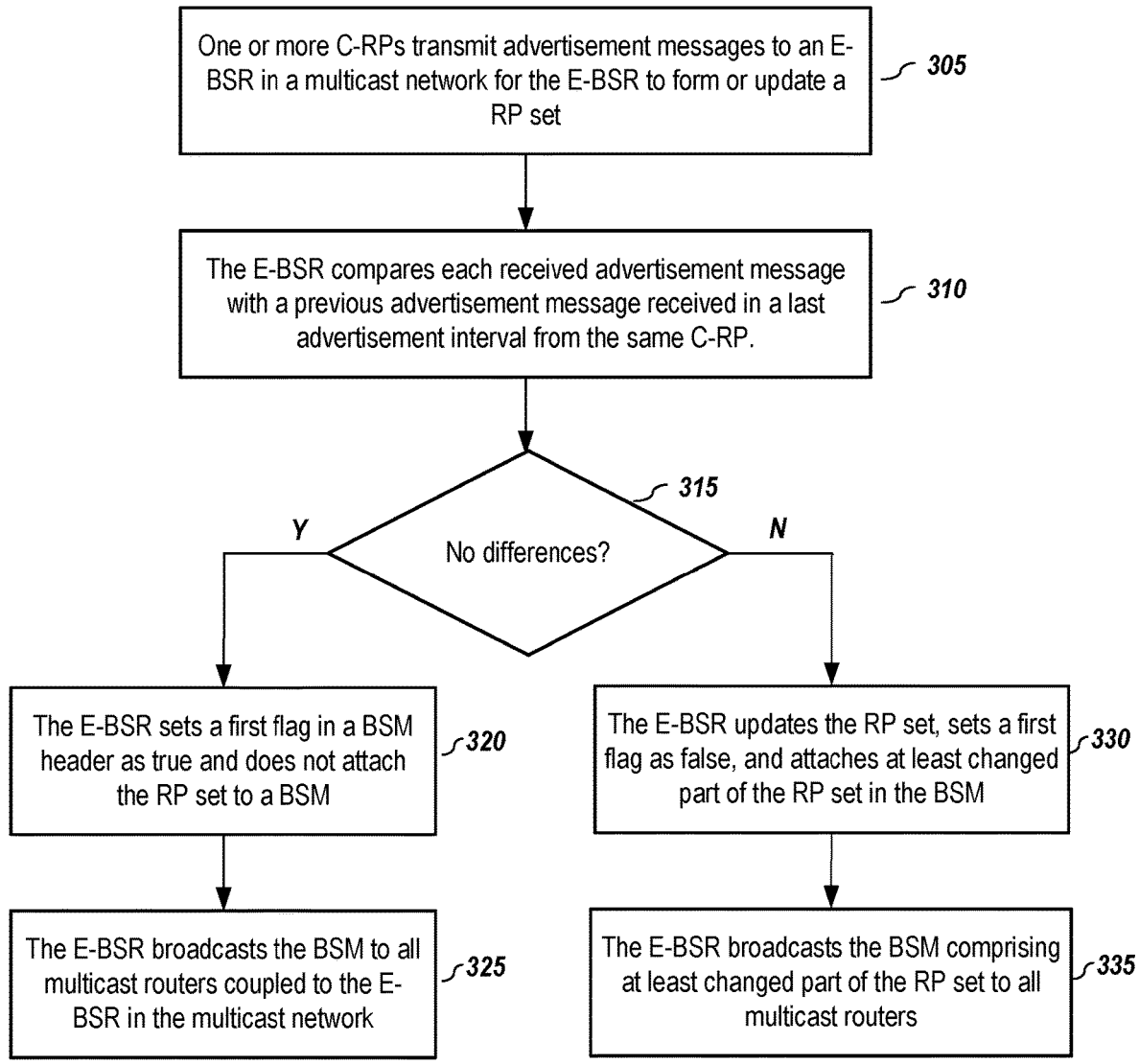
FIG. 3 depicts a process of generating BSM at an E-BSR, according to embodiments of the present disclosure.

FIG. 3 depicts a process of generating BSM at an E-BSR, according to one or more embodiments of the present disclosure. One or more C-RPs transmit (305) advertisement messages comprising group-to-RP mapping information to an E-BSR in a multicast network for the E-BSR to form or update a RP set for the multicast network. The E-BSR compares (310) each received advertisement message with a previous advertisement message received in a last advertisement interval from the same C-RP and verifies (315) whether any difference exists. In response to no difference for each received advertisement message from all the C-RPs, the E-BSR sets (320) the first flag in the BSM header as true, and does not attach the RP set in a BSM. In other words, the BSM comprises only the BSM header. Following step 320, the E-BSR broadcasts (325) the BSM to all multicast routers coupled to the E-BSR in the multicast network. In response to changes identified for one or more advertisement messages from all the C-RPs, the E-BSR updates (330) the RP set, sets the first flag as false in a BSM and attaches at least changed part of the RP set in the BSM. Following step 330, the E-BSR broadcasts (335) the BSM comprising at least changed part of the RP set to one or more multicast routers coupled to the E-BSR in the multicast network.

In one or more embodiments, once difference in one or more advertisement messages from all the C-RPs is identified, the E-BSR broadcasts a BSM comprising the whole RP set, with each group section within the RP set incorporated one secondary flag set as logic true or false depending on whether difference is identified for the group section.

In one or more embodiments, once difference in one or more advertisement messages from the C-RPs is identified, the E-BSR broadcasts a BSM comprising a BSM header incorporating the first flag set as logic false and only group sections incorporated with a secondary flag set as logic false. In other words, those group sections with a secondary flag set as logic true (indicating no changes for the group sections) are not included in the BSM to be broadcasted.

2. Embodiments of Incorporating One or More GNC Flags

In one or more embodiments, once the first flag is set as false, a secondary flag may be further incorporated for each group section for more details of the changed information. The secondary flag, also-known-as a group no change (GNC) flag or a group flag, indicates whether there is any difference in a corresponding group section in the BSM. Each secondary flag may use one or more reserved bits 228 in a group header 222 of a corresponding group section 220. In one or more embodiments, the GNC flag is one bit with logic "1" or true indicting no changes for the corresponding group and logic "0" or false indicting change occurred in the corresponding group section in the RP set.

In one or more embodiments, once difference in one or more advertisement messages from all the C-RPs is identified, the E-BSR broadcasts a BSM comprising a complete RP set with a GNC flag incorporated for each group section having identified difference in C-RP information. In one or more embodiments, once difference in one or more advertisement messages from the C-RPs is identified, the E-BSR broadcasts a BSM only including group sections with a false GNC flag. In other words, group sections with true GNC flag are not included in the broadcasted BSM.

By incorporating NC and/or GNC flags into the BSM, the size of the BSM message to be broadcasted may be dynamically determined in each C-RP advertisement interval. Especially, the size of BSM message may be reduced significantly when there is no change in the RP set information.

Normally, when a BSM comprising all groups is big, the BSM may need to be split or fragmented into multiple BSMFs. In one or more embodiments, the E-BSR may first identify changed groups in the BSM and only incorporates those changed groups into a multicast BSM. Before transmitting the multicast BSM, the E-BSR determines whether fragmentation is needed for the multicast BSM. In one or more embodiments, the multicast BSM may comprise only changed groups, and therefore may be small enough to avoid fragmentation, or need less numbers of BSMFs compared to the BSM comprising all group sections.

B. Embodiments of Multicast Router Operation after Receiving BSM

By incorporating NC and/or GNC flags into the BSM, the processing of the BSM at multicast routers may be simplified. Therefore, the operation efficiency of the multicast network may also be improved.

After receiving the BSM from the BSR, each multicast router forwards this information to its directly connected PIM neighbors. In one or more embodiments, if there is a new PIM neighbor for a multicast router, the multicast router sends an entire current RP set, regardless whether the received BSM has only a BSM header or only groups with identified changes. The entire current RP set may be fetched by the multicast router from its database in one or more embodiments.

Figure 4:
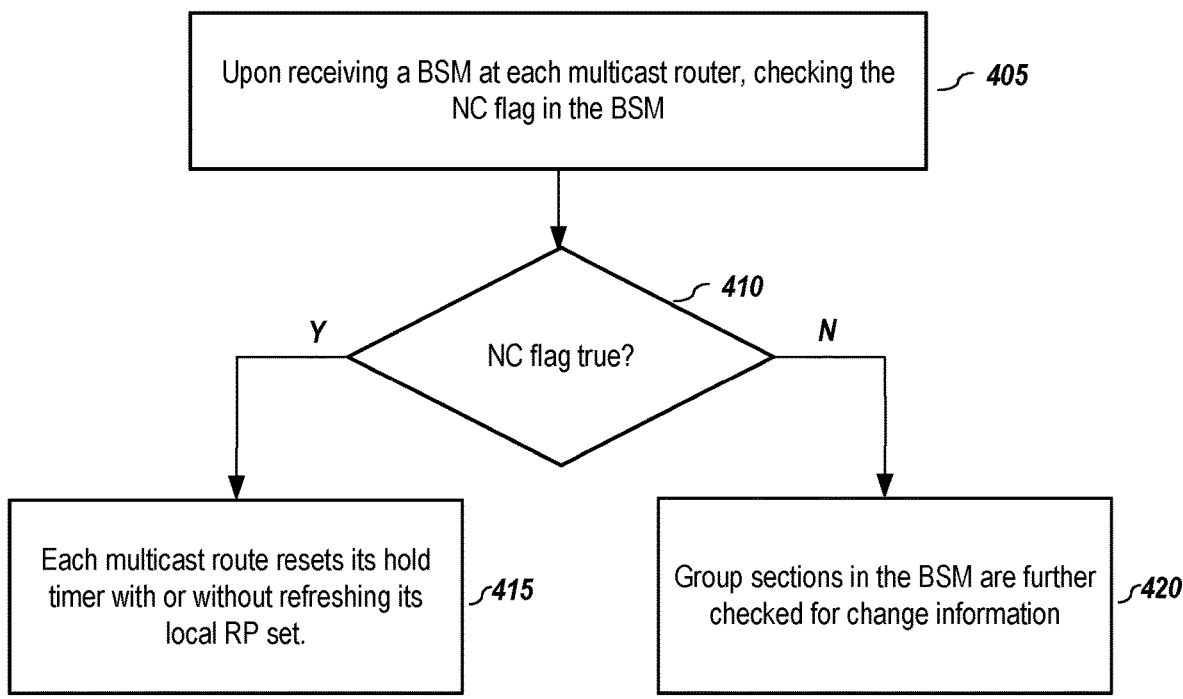
FIG. 4 depicts an operation process after receiving BSM at a multicast router, according to embodiments of the present disclosure.

FIG. 4 depicts an operation process after receiving BSM at each multicast router, according to embodiments of the present disclosure. Upon receiving the BSM, each multicast router checks (405) the NC flag to verify (410) whether the NC flag is true.

In response to the NC flag is true (no change in the entire RP set), each multicast route resets (415) its hold timer. In one or more embodiments, each multicast route may or may not refresh its local RP set or group-to-RP mapping information.

In response to the NC flag is false (which means change to the RP set occurred), groups sections in the BSM are further checked (420) for change information. In one or more embodiments, one or more multicast routes within address ranges of the one or more changed group sections (e.g. group sections with a false GNC flag) reset each hold timer and elect a common RP router for the group. The common RP router may or may not be the same with the previous RP router in the group. In one or more embodiments, the selection of the common RP router is done by implementing a common algorithm for each multicast router within the group such that each multicast router elects the same common RP router. In one or more embodiments, a C-RP, among all C-RPs, having the longest match of its serving group range with a multicast group is selected as the common RP. In one or more embodiments, when multiple C-RPs serve the exact same group range, the C-RP with highest priority may be selected as the common RP. In one or more embodiments, when the serving groups and priority of multiple C-RPs are the same, the C-RP with the highest hash value from a hash function is selected as the common RP for the multicast group.

In one or more embodiments, upon receiving the BSM, multicast routes corresponding to an unchanged group section may reset their hold timers with or without refreshing their group-to-RP mapping information.

In one or more embodiments, if the BSM comprises a new group section, each multicast router corresponding to this new group section may add a new entry to its group-to-RP mapping table.

C. Some Other Embodiments

Figure 5:
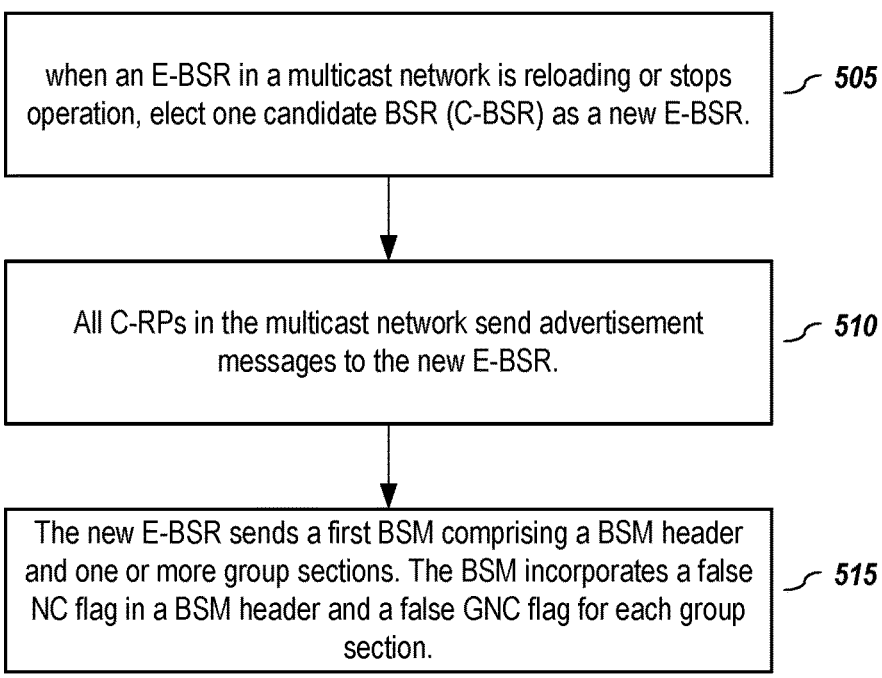
FIG. 5 depicts a process of generating BSM for a new E-BSR, according to embodiments of the present disclosure.

FIG. 5 depicts a process of generating BSM for a new E-BSR, according to embodiments of the present disclosure. In one or more embodiments, when an E-BSR in a multicast network is reloading or stops operation, one candidate BSR (C-BSR) is elected (505) as a new E-BSR. All C-RPs in the multicast network send (510) advertisement or C-RP messages to the new E-BSR. The new E-BSR sends (515) a first BSM comprising a BSM header and one or more group sections. The BSM incorporates a false NC flag in a BSM header and a false GNC flag for each group section.

FIG. 6 depicts a process of generating a BSM when a C-RP is removed from a RP set, according to embodiments of the present disclosure. In response to a C-RP removed from a RP set, the E-BSR generates (605) a BSM comprising a BSM header with a false NC flag and one or more group sections with a false GNC flag for each group section.

D. Modeling Embodiments

In this section, some mathematic models are given for further explanation according to one or more embodiments of the present invention. It shall be noted that any mathematic expressions and results provided herein are provided by way of illustration and were performed under specific conditions using a specific embodiment or embodiments; accordingly, neither these mathematic expressions nor their results shall be used to limit the scope of the disclosure of the current patent document.

Once an E-BSR is elected, all C-RPs in the multicast network send their local RP set messages (or advertisement messages) to the E-BSR. Assuming 'R' is the total number of C-RPs advertising groups and $r_i$ is the number of groups advertised by C-RP$_i$, total number of RP set messages sent to E-BSR may be expressed as:

$$T_{Send} = r_1 + r_2 + \ldots r_R \qquad (1)$$

For the sake of explanation, assuming all C-RPs advertise same number of groups, i.e. $r_1=r_2=\ldots=r_R=r$, the total of RP set messages may be expressed as:

$$TRP = R*r \qquad (2)$$

where TRP denotes the total number of RP messages received by E-BSR from the C-RPs.

In one or more embodiments, with a default MTU, only 64 groups' information can be sent over a BSM message. So if there are more than 64 groups, a number of [TRP mod 64] BSM messages are needed, if TRP is perfect multiple of 64. If TRP is not a perfect multiple of 64, [(TRP mod 64)+1] BSM messages are needed. For the sake of explanation, assuming that TRP is not a perfect multiple of 64 and hence the total number of messages sent by E-BSR to one multicast router would be [(TRP mod 64)+1].

In operation, the E-BSR will send these BSM messages to all connected multicast enabled routers on the multicast network which they will forward to the multicast routers in their PIM neighbors. Considering that there are N routers and each of these multicast routers has p PIM neighbors, these BSM messages are sent to all N*p PIM neighbors. Therefore, total number of BSM messages sent in the multicast domain, during one advertisement interval would be (N*p) [(TRP mod 64)+1].

In one or more embodiments of the present invention, if there is no change during consecutive advertisement intervals, rather than sending the entire BSM group messages, the E-BSR sends out a single BSM message with a header and a true NC flag. The total number of BSM messages sent in the multicast domain during one advertisement interval would be (N*p)*1. If there is any change in the individual RP set, the number of BSM messages will be the same as (N*p)*[(TRP mod 64)+1].

If there is no change, according to one or more embodiments of the present invention, the percentage efficiency in terms of number of BSM messages may be calculated as:

$$\% \text{ efficiency} = \frac{\{(N*p)*[(TRP \bmod 64)+1]\} - \{(N*p)*1\}}{\{(N*p)*[(TRP \bmod 64)+1]\}} *100 \qquad (3)$$

In one example for illustration, assuming N*p=5*2=10, and there are 4 RPs wishing to advertise 130 groups each, TRP may be expressed as TRP=R*r=4*130=520, which is not a perfect multiple of 64. The % efficiency achieved according to one or more embodiments of the present disclosure, with respect to the number of BSM messages sent may be calculated as:

$$\% \text{ efficiency} = \frac{\{(N*p)*[(TRP \bmod 64)+1]\} - \{(N*p)*1\}}{\{(N*p)*[(TRP \bmod 64)+1]\}} *10 =$$

-continued $$\frac{\{(10)*[(520 \bmod 64)+1]\}-\{(10)*1\}}{\{(10)*[(520 \bmod 64)+1]\}}*100 = 88.88\%$$

E. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 7:
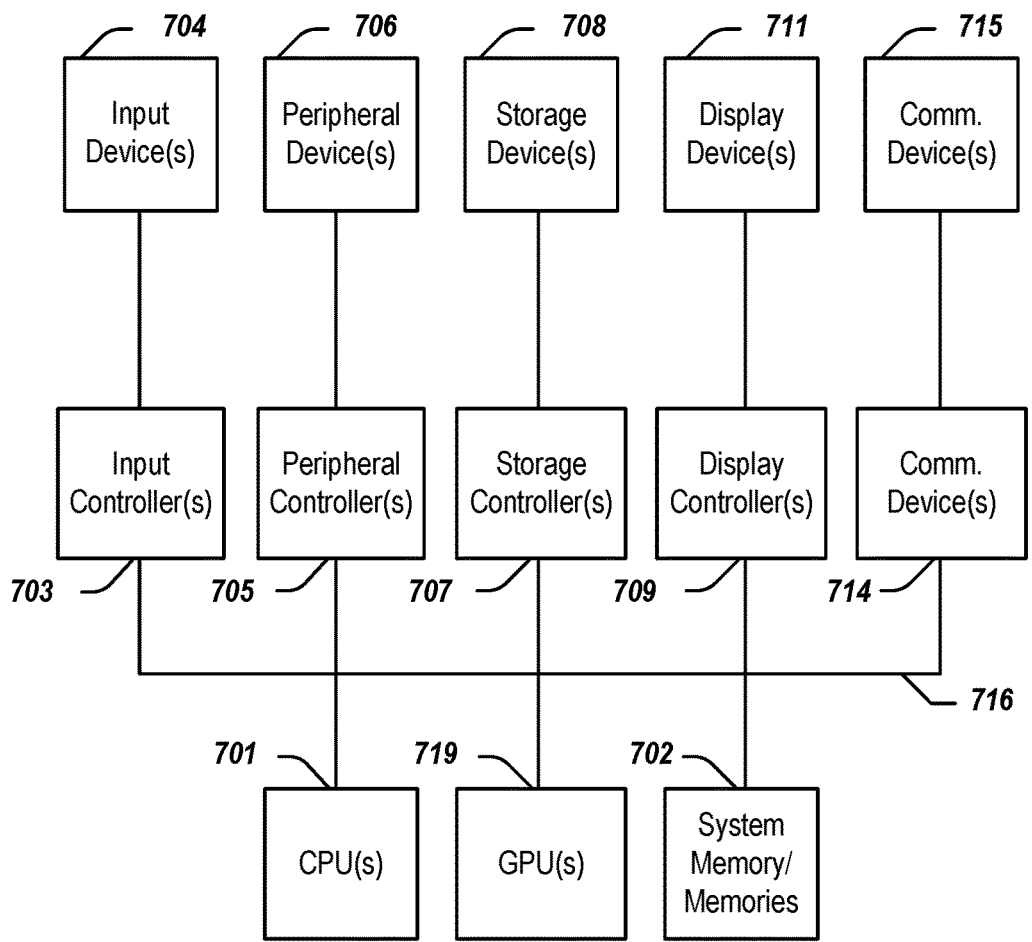
FIG. 7 depicts a simplified block diagram of an information handling system according to embodiments of the present invention.

FIG. 7 depicts a simplified block diagram of an information handling system (or computing system) according to embodiments of the present disclosure. It will be understood that the functionalities shown for system 700 may operate to support various embodiments of a computing system—although it shall be understood that a computing system may be differently configured and include different components, including having fewer or more components as depicted in FIG. 7.

As illustrated in FIG. 7, the computing system 700 includes one or more central processing units (CPU) 701 that provides computing resources and controls the computer. CPU 701 may be implemented with a microprocessor or the like, and may also include one or more graphics processing units (GPU) 719 and/or a floating-point coprocessor for mathematical computations. System 700 may also include a system memory 702, which may be in the form of random-access memory (RAM), read-only memory (ROM), or both.

A number of controllers and peripheral devices may also be provided, as shown in FIG. 7. An input controller 703 represents an interface to various input device(s) 704, such as a keyboard, mouse, touchscreen, and/or stylus. The computing system 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present disclosure. Storage device(s) 708 may also be used to store processed data or data to be processed in accordance with the disclosure. The system 700 may also include a display controller 709 for providing an interface to a display device 711, which may be a cathode ray tube (CRT), a thin film transistor (TFT) display, organic light-emitting diode, electroluminescent panel, plasma panel, or other type of display. The computing system 700 may also include one or more peripheral controllers or interfaces 705 for one or more peripherals 706. Examples of peripherals may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Figure 8:
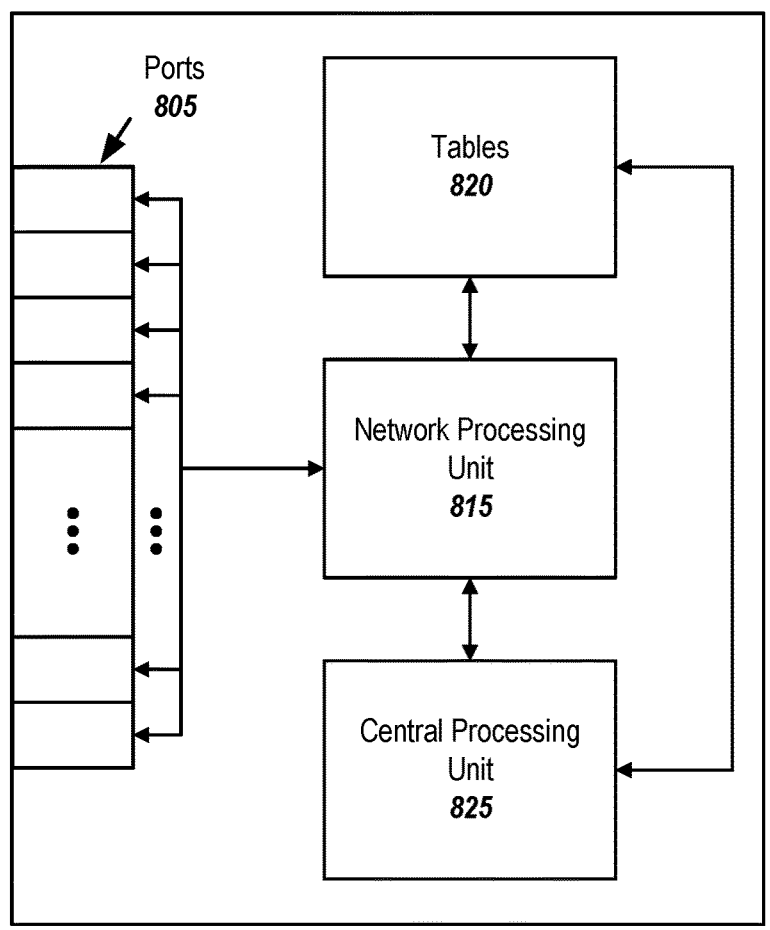
FIG. 8 depicts an alternative block diagram of an information handling system, according to embodiments of the present disclosure.

FIG. 8 depicts an alternative block diagram of an information handling system, according to embodiments of the present disclosure. It will be understood that the functionalities shown for system 800 may operate to support various embodiments of the present disclosure—although it shall be understood that such system may be differently configured and include different components (including fewer or more components).

The information handling system 800 may include a plurality of I/O ports 805, a network processing unit (NPU) 815, one or more tables 820, and a central processing unit (CPU) 825. The system includes a power supply (not shown) and may also include other components, which are not shown for sake of simplicity.

In one or more embodiments, the I/O ports 805 may be connected via one or more cables to one or more other network devices or clients. The network processing unit 815 may use information included in the network data received at the node 800, as well as information stored in the tables 820, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for broadcasting a bootstrap message (BSM) in a multicast network, the method comprising:
   receiving, at an elected bootstrap router (E-BSR) in the multicast network, one or more advertisement messages from one or more candidate Rendezvous Points (C-RPs) to update an RP set for the multicast network;
   comparing, at the E-BSR, each received advertisement message to a previous advertisement message received in a last advertisement interval from a same C-RP;
   verifying, at the E-BSR, whether any difference exists for each advertisement message;
   in response to no difference identified for the one or more advertisement messages, the E-BSR incorporates in a BSM header of the BSM a first flag with a value indicating no difference for the RP set and broadcasts the BSM, which comprises the BSM header and no group sections for the RP set, to multicast routers coupled to the E-BSR in the multicast network; and
   in response to difference identified for one or more received advertisement messages, the E-BSR updates the RP set using the one or more received advertisement messages, incorporates in the BSM header of the BSM the first flag with a value indicating change occurred in the RP set, and broadcasts the BSM with at least changed part of the RP set to multicast routers coupled to the E-BSR in the multicast network.

2. The computer-implemented method of claim 1 wherein the first flag uses one or more reserved bits in the BSM header.

3. The computer-implemented method of claim 2 wherein the first flag is a no change (NC) flag set as logic true in response to no difference for the RP set or set as logic false in response to change occurred for the RP set.

4. The computer-implemented method of claim 1 wherein the RP set comprises one or more group sections with each group section comprise a group header indicating group information and one or more C-RP sections indicating information of one or more C-RPs within each group section.

5. The computer-implemented method of claim 4 wherein:
   in response to difference identified for one or more received advertisement messages, the E-BSR further incorporates a secondary flag in each group section of the RP set to indicate whether there is a change for each group section.

6. The computer-implemented method of claim 5 wherein the secondary flag uses one or more reserved bits in the group header.

7. The computer-implemented method of claim 6 wherein the secondary flag is a group no change (GNC) flag set as logic true for a group section with no difference identified with respect to the one or more C-RPs within the group section, or set as logic false for a group section with difference identified.

8. The computer-implemented method of claim 7 wherein:
   in response to difference identified for one or more received advertisement messages, the E-BSR broadcasts the BSM to multicast routers coupled to the E-BSR in the multicast network, the BSM comprises the BSM header with the first flag set as logic false and a whole RP set, each group section within the RP set is incorporated one secondary flag set as logic true or false depending on whether difference is identified for the group section.

9. The computer-implemented method of claim 7 wherein:
   in response to difference identified for one or more received advertisement messages, the E-BSR broadcasts the BSM to multicast routers coupled to the E-BSR in the multicast network, the BSM comprises the BSM header incorporating the first flag set as logic false and only group sections incorporated with a secondary flag set as logic false.

10. A computer-implemented method for bootstrap message (BSM) processing in a multicast network comprising multiple multicast routers, the method comprising:
receiving, at each of a plurality of multicast routers communicatively coupled to an elected bootstrap router (E-BSR), a BSM from the E-BSR, the BSM comprises at least a BSM header incorporated with a first flag to indicate whether a Rendezvous Point (RP) set for the multicast network is changed, the RP set comprises one or more group sections with each group section comprise a group header indicating group information and one or more candidate RP (C-RP) sections indicating information of one or more C-RPs within each group section;
checking, at a multicast router, the first flag to verify whether there is a change information in the BSM;
in response to the first flag indicating no change for the RP set, resetting a hold timer for the multicast router; and
in response to the first flag indicating change occurred for the RP set, checking one or more group sections within the BSM for change information.

11. The computer-implemented method of claim 10 wherein in response to the first flag indicating no change information in the BSM for the RP set, the multicast router refreshes its group-to-RP mapping information besides resetting the hold timer.

12. The computer-implemented method of claim 10 wherein the first flag uses one or more reserved bits in the BSM header, the first flag is set as logic true to indicate no change information in the BSM or set as logic false to indicate change information in the BSM.

13. The computer-implemented method of claim 10 wherein the BSM further comprises at least one or more group sections with each group section comprising a group flag indicating whether there is change for each group section.

14. The computer-implemented method of claim 13 further comprising in response to the first flag indicating change occurred for the RP set, one or more multicast routes, within address ranges of one or more group sections with a group flag indicating there is change, elect a common RP router for the group, the group flag is a group no change (GNC) flag set as logic false when there is change for a corresponding group section.

15. A multicast system comprising:
one or more candidate Rendezvous Points (C-RPs), each C-RP configured to send an advertisement message comprising group-to-RP mapping information of the C-RP with an advertisement interval; and
an elected bootstrap router (E-BSR) communicatively coupled to the one or more C-RPs to receive advertisement messages to form or update an RP set, the E-BSR configured to:
compare each received advertisement message to a corresponding previous advertisement message sent by a same C-RP in a last advertisement interval for difference identifying, and
in response to no difference identified for any advertisement messages, broadcast, to one or more multicast routers coupled to the E-BSR in the multicast system, a bootstrap message (BSM) with a BSM header and no information for the RP set, the BSM header comprising a first flag with a value indicating no change to the RP set; and
in response to difference identified for any advertisement messages, update the RP set and broadcast, to one or more multicast routers coupled to the E-BSR in the multicast system, a BSM with a BSM header and at least updated sections in the RP set, the BSM header is incorporated with a first flag with a value indicating change occurred to the RP set.

16. The multicast system of claim 15 wherein the first flag uses one or more reserved bits in the BSM header, the first flag is set as logic true in response to no difference identified or set as logic false in response to difference identified.

17. The multicast system of claim 15 wherein the RP set comprises one or more group sections with each group section comprise a group header indicating group information and one or more C-RP sections indicating information of one or more C-RPs within each group section.

18. The multicast system of claim 17 wherein the group header of each group section is incorporated with a group flag to indicate whether the group section is updated, the group flag uses one or more reserved bits in the group header, the group flag is set as logic true in response to no difference for the group section or set as logic false in response to change occurred for the group section.

19. The multicast system of claim 18 wherein the E-BSR is further configured to:
in response to difference identified for one or more received advertisement messages, broadcast the BSM with the BSM header and the RP set, with one group flag incorporated in each group section.

20. The multicast system of claim 18 wherein the E-BSR is further configured to:
in response to difference identified for one or more received advertisement messages, broadcast the BSM with the BSM header and only group sections incorporated with a secondary flag set as logic false.

* * * * *